March 8, 1966 F. K. P. ECHARTI 3,239,780

MODULATOR HAVING VARIABLE MAGNITUDE IMPEDANCE
FOR REGULATING THE OPERATING ATTENUATION
Filed July 30, 1963

INVENTOR
FRIEDRICH KARL PETER ECHARTI
BY Haase and Nydick
ATTORNEYS

United States Patent Office 3,239,780
Patented Mar. 8, 1966

3,239,780

MODULATOR HAVING VARIABLE MAGNITUDE IMPEDANCE FOR REGULATING THE OPERATING ATTENUATION

Friedrich Karl Peter Echarti, Enskede, Sweden, assignor to Telefonaktiebolaget L M Ericsson, Stockholm, Sweden, a corporation of Sweden Filed July 30, 1963, Ser. No. 298,621
Claims priority, application Sweden, Sept. 5, 1962, 9,589/62
12 Claims. (Cl. 332—38)

The present invention refers to an arrangement in modulators comprising at least one pair of transistor signal amplifiers connected in parallel for the carrier frequency voltage and push-pull connected for the modulating signal voltage. Each of the transistors has an emitter electrode (common terminal) connected by resistors provided with a first input; base electrodes (input terminals) connected by a winding of a first transformer (input means) provided with a second input; and collector electrodes (output terminals) connected by means of a winding of a second transformer (output means). The carrier frequency voltage is received across the first and second inputs. The modulating signal voltage is fed to the first transformer, and the modulated carrier voltage signal is transmitted by the second transformer.

The invention is thereby characterized in the main by the fact that between the emitter electrodes there is connected a two terminal variable impedance network means for regulating the operating attenuation of the modulator without changing the operating point for the transistors as determined by the supply voltage and carrier frequency voltage being changed and without the input and output impedances of the modulator being influenced.

Figure 1:
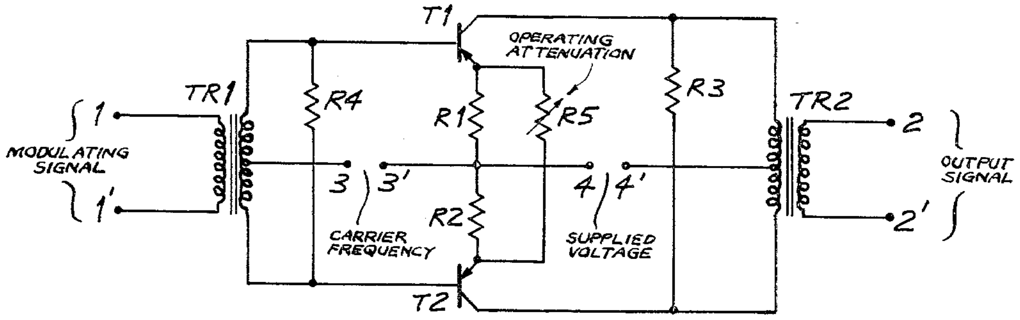
Figure 2:
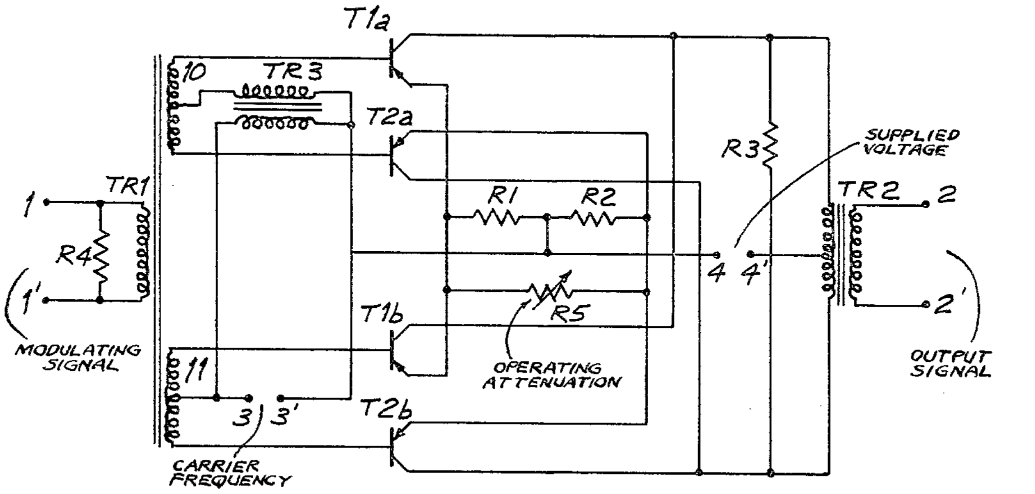

The invention will be further described in connection with the attached drawing, where FIG. 1 shows in principle the connection for a modulator with regulating means according to the invention and FIG. 2 shows an extended form of embodiment of the connection in FIG. 1.

In FIG. 1 a modulator is shown in principle, comprising two transistors T1 and T2 connected in parallel. The transistors may be of the npn or pnp-type. The emittter electrodes of the transistors are connected together by serially connected resistors R1 and R2. The base electrodes are respectively connected to arms of the secondary winding of an input transformer TR1. The arms of the primary winding of the transformer are connected to input terminals 1 and 1′ of the modulator which receive the modulating signal voltage. The collector electrodes of the transistors are connected to arms of the secondary winding on an output transformer TR2. The arms of the secondary winding of the transformer TR2 are connected to the output terminals 2 and 2′ of the modulator which transmit the modulated carrier signal voltage. The base electrodes of the transistors are further connected by a resistor R4 and the collector electrodes by a resistor R3. Furthermore, the emitter electrodes are connected by an adjustable resistor R5, that is, a two terminal variable impedance network means. The modulator is further provided with an input 3, 3′ via which the carrier frequency voltage is fed to the modulator and an input 4, 4′ via which a direct supply voltage is fed in order to provide the necessary operating voltages for the transistors. The input 3, 3′ is connected on one hand to the junction of resistors R1 and R2 and on the other to the centertap of the secondary winding of the transformer TR1 and the input 4, 4′ is connected on the one hand to said junction and on the other to the centertap of the secondary winding of the transformer TR2.

During the initial design of the modulators, the resistors

R4 and R3 are dimensioned in relation to the impedances of the active elements so that their resistances will determine the input impedance with respect to the output impedance of the modulator. By means of the resistors R1 and R2 the amplification and, alternatively, the attenuation of the modulator is chosen. These resistors further cause a stabilization of the operating point of the transistors for amplitude variations of the carrier frequency voltage and for changes in current amplification and temperature.

Once the modulator has been built by means of resistor R5 the operating attenuation of the modulator can be regulated. This regulation may be achieved gradually or continuously. Since the only variable element, resistor R5, is connected between the emitter electrodes, this regulation will be independent of the carrier frequency. The regulation can also be made dependent on frequency, if the resistor R5 is connected in parallel with, for instance, a capacitor or an inductor. The resistor may also be replaced by only a variable inductor or a variable capacitor or any other combination of said three elements. In other words, the operating attenuation is controlled by a two terminal variable impedance network. The regulation may further be achieved without the operating point being changed for the transistors as determined by the connected supply voltage and the received carrier frequency voltage. The proper dimensioning of the input and output impedances of the modulator, of which much is demanded, will also not be influenced by the regulation.

The modulator in FIG. 1 operates so that if, for instance, the transistors T1 and T2 are of the pnp-type and the positive pole of a direct voltage source is connected to terminal 4 and the negative pole to terminal 4′, negative potential is obtained at terminal 3 in the negative half periods of the carrier frequency voltage. The transistors T1 and T2 are thereby open for the modulating signal voltage fed to terminals 1 and 1′, so that it can pass through the output transformer TR2. In the positive half period of the carrier frequency voltage the potential on terminal 3 turns positive whereby the transistors are blocked and a signal cannot consequently pass to the transformer TR2.

With the connection shown in FIG. 1 a voltage in the output transformer TR2 is thus obtained only during one half period of the carrier frequency voltage. In order to be able to utilize also the other half period two more transistors connected in parallel are supplied, so that a connection according to FIG. 2 is obtained.

The two groups of transistors shown therein, T1*a*, T2*a* and T1*b*, T2*b* are connected in parallel to the output transformer TR2. The input transformer TR1 has two secondary windings 10 and 11. The winding 10 connects the base electrodes of the transistors T1*a* and T2*a* and the winding 11 the base electrodes of the transistors T1*b* and T2*b*. The windings 10 and 11 are so constructed that the signal voltage across one winding is 180° out of phase with respect to the voltage across the other winding. The resistor R4 is on the primary side of the transformer TR1 connected across the input terminals 1 and 1′. Across the primary winding of the output transformer TR2 there is connected resistor R3. The emitter electrodes are also, as above connected by means of resistors R1 and R2. Furthermore the emitter electrode of transistor T1*a* is connected to the emitter electrode of transistor T1*b* and the same applies to corresponding electrodes and transistors T2*a* and T2*b*. For the regulation of the operating attenuation of the modulator a variable resistor R5 is connected between the junction of the emitter electrodes of transistors T1*a* and T1*b* and the junction of the emitter of electrodes of transistors T2*a* and T2*b*. This resistor, in other words, connects the emitter electrodes of the transistors T1*a* and T2*a*, and T1*b* and T2*b*.

It is applicable also here that the resistor may be replaced by an inductor or a capacitor or by any combination of said three lements.

The carrier frequency voltage is fed to the inputs 3 and 3'. The input 3 is on one hand connected directly to the winding 11, and on the other via a transformer TR3 to the transformer 10. The windings of the transformer TR3 are so constructed that the carrier frequency voltage fed to the winding 10 is dephased 180° out of phase in relation to the carrier frequency voltage fed to the winding 11. By this means, during positive half periods of the carrier frequency voltage, a positive voltage will be fed to the base electrodes of transistors T1*b* and T2*b* and negative voltage to the base electrodes of transistors T1*a* and T2*a*. On the other hand, during negative half periods a positive voltage is fed to the base electrodes of transistors T1*a* and T2*a* and negative voltage is fed to the base electrodes of transistors T1*b* and T2*b*. Through the different embodiments of the windings 10 and 11 the modulating signal voltage passing through the winding 10 will always be 180° out of phase in relation to the modulating signal voltage through the winding 11. From the output transformer TR2 output voltage is thus obtained during the positive as well as in the negative half periods of the carrier frequency voltage, whereby the voltage during the positive half period is 180° out of phase in relation to the voltage during the negative half period.

One more advantage, in addition to the ones noted earlier, of the regulating arrangement, which the described modulator comprises, is that it does not influence the amplitudes of the harmonic products appearing in the modulator. The regulating network, which in the form of a variable impedance is inserted in the modulator, thus restores a part of the obtained voltage. This comprises harmonic voltages obtained during modulation. These fed back voltages will thus have opposite phase in relation to the harmonic voltages appearing in the modulator. As the fed back harmonic voltages are modulated again, they do not obtain the same frequency as the originally appearing harmonic voltages. The voltages fed back through the regulating network thus have opposite phase and different frequency in relation to the original harmonic voltages. Any suppression of the harmonic voltages will therefore not take place. A change in the impedance of the inserted regulating network thus does not either cause a change in the attenuation of the harmonic products obtained in the ouput of the modulator.

I claim:

1. A modulator comprising: an input means including first, second and third input terminals, and first and second output terminals, said first and second input terminals for receiving a modulating signal voltage; and output means including first and second input terminals and output terminal means for transmitting a modulated carrier frequency voltage; first and second signal amplifier means, each including input, output and common terminals; means for connecting the input terminal of said first signal amplifier means to the first output terminal of said input means; means for connecting the input terminal of said second signal amplifier means to the second output terminal of said input means; means for connecting the output terminal of said first signal amplifier means to the first input terminal of said output means; means for connecting the output terminal of said second signal amplifier means to the second input terminal of said output means; junction means connected to the common terminals of said first and second signal amplifier means, said junction means and the third input terminal of said input means being adapted to receive a carrier frequency voltage; and a two terminal variable magnitude impedance means including a first terminal connected to the common terminal of said first signal amplifier means and a second terminal connected to the common terminal of said second signal amplifier means for regulating the operating attenuation of the modulator.

2. The modulator of claim 1, wherein said junction means comprises first and second serially connected resistors.

3. The modulator of claim 1, wherein said junction means comprises first and second serially connected fixed resistors and said two terminal variable magnitude impedance means is a variable resistor.

4. A modulator comprising: an input transformer including a primary winding for receiving a modulating signal voltage, and a secondary winding having first and second arms and a centertap; first and second transistors, each including emitter, collector and base electrodes; output means including first and second input terminals and output terminal means for transmitting a modulated carrier frequency voltage; means for connecting the base electrode of said first transistor to the first arm of the secondary winding of said input transformer; means for connecting the base electrode of said second transistor to the second arm of the secondary winding of said input transformer; means for connecting the collector electrode of said first transistor to the first input terminal of said output means; means for connecting the collector electrode of said second transistor to the second input terminal of said output means; junction means connected to the emitter electrodes of said transistors, said junction means and the centertap of the secondary winding of said input transformer being adapted to receive a carrier frequency voltage; means for receiving a direct current voltage to supply operating potentials to said transistors; and a two terminal variable magnitude impedance means including a first terminal connected to the emitter electrode of said first transistor and a second terminal connected to the emitter electrode of said second transistor for regulating the operating attenuation of the modulator without changing the operating point of said transistors.

5. The modulator of claim 4, wherein said junction means comprises first and second serially connected resistors.

6. The modulator of claim 4, wherein said junction means comprises first and second serially connected fixed resistors and said two terminal variable magnitude impedance means is a variable resistor.

7. A modulator comprising: an input transformer including a primary winding for receiving a modulating signal voltage, and a secondary winding having first and second arms and a centertap; first and second transistors, each including emitter, collector and base electrodes; an output transformer including a secondary winding for transmitting a modulated carrier frequency voltage, and a primary winding having first and second arms and a centertap; means for connecting the base electrode of said first transistor to the first arm of the secondary winding of said input transformer; means for connecting the base electrode of said second transistor to the second arm of the secondary winding of said input transformer; means for connecting the collector electrode of said first transistor to the first arm of the primary winding of said output transformer; means for connecting the collector electrode of said second transistor to the second arm of the primary winding of said output transformer; first impedance means including first and second terminals and a junction means intermediate said terminals; means for connecting the emitter electrode of said first transistor to said first terminal; means for connecting the emitter electrode of said second transistor to said second terminal, said junction means and the centertap of the secondary winding of said input transformer being adapted to receive a carrier frequency voltage, said junction means and the centertap of the primary winding of said output transformer being adapted to receive a supply voltage; and a two terminal variable magnitude impedance means including a first terminal connected to the emitter electrode of said first transistor and a second terminal connected to the emitter electrode of said second transistor for regulating the operating attenuation of the modulator without changing the operating point of said transistors.

8. The modulator of claim 7, wherein said first impedance means comprises first and second serially connected resistors, the junction of said resistors being said junction means.

9. The modulator of claim 7, wherein said two terminal variable magnitude impedance means is a variable resistor.

10. The modulator of claim 9, wherein said first impedance means comprises first and second serially connected fixed resistors and the junction of said fixed resistors being said junction means.

11. A modulator comprising: an input transformer having a primary winding adapted to receive a modulating signal voltage and first and secondary windings, each of said secondary windings having first and second arms and a centertap; an output transformer including a secondary winding adapted to transmit a modulated carrier frequency voltage, and a primary winding having first and second arms and a centertap; a phase-shifting transformer including primary and secondary windings each having first and second arms, the primary winding being adapted to receive a carrier frequency voltage; first, second, third and fourth transistors, each having emitter, base and collector electrodes; means for connecting the first and second arms of the first secondary winding of said input transformer to the base electrodes of said first and second transistors, respectively; means for connecting the first and second arms of the second secondary winding of said input transformer to the base electrodes of said third and fourth transistors, respectively; means connecting the collector electrodes of said first and third transistors to the first arm of the primary winding of said output transformer; means for connecting the collector electrodes of said second and fourth transistors to the second arm of the primary winding of said output transformer; first and second serially connected resistors; means for connecting the free end of said first resistor to the emitter electrodes of said first and third transistors; means for connecting the free end of said second resistor to the emitter electrodes of said second and fourth transistors; means for connecting the junction of said first and second resistors to the second arms of the primary and secondary windings of said phase-shifting transformer; means for connecting the first arms of the primary and secondary windings of said phase-shifting transformer to the centertaps of the first and second secondary windings of said input transformer, respectively; the junction of said first and second resistors and the centertap of the primary of said output transformer being adapted to receive a supply voltage for establishing operating potentials for the electrodes of said transistors; and a two terminal variable impedance means including a first terminal connected to the emitter electrodes of said first and third transistors and a second terminal connected to the emitter electrodes of said second and fourth transistors for regulating the operating attenuation of the modulator without changing the operating point of said transistors.

12. The modulator of claim 11, wherein said two terminal variable impedance means is a variable resistor.

References Cited by the Examiner

UNITED STATES PATENTS 2,129,313 9/1938 Whitelock ---------- 332—43 X

HERMAN KARL SAALBACH, *Primary Examiner.*

P. G. GENSLER, *Assistant Examiner.*